Nov. 4, 1924.
F. MULLER
CUTTER GRINDING ATTACHMENT
Filed June 27, 1921
1,514,392
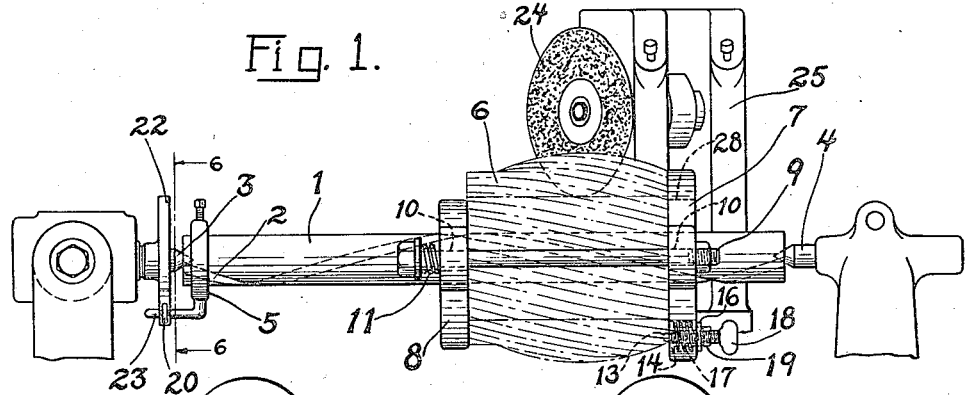
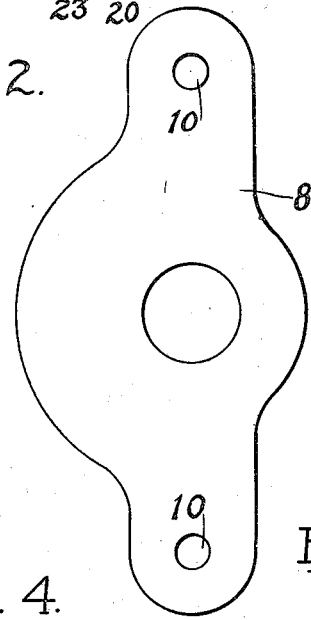
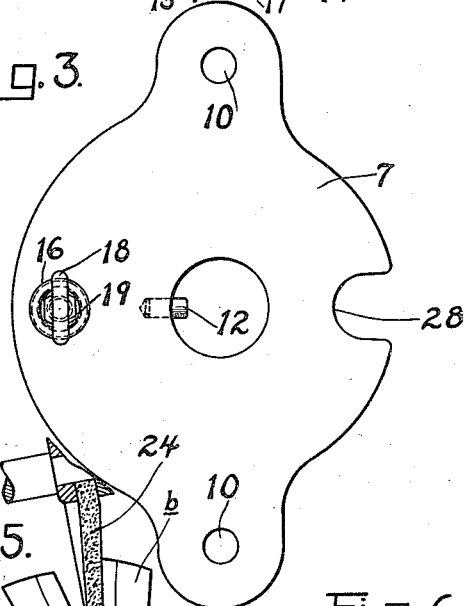
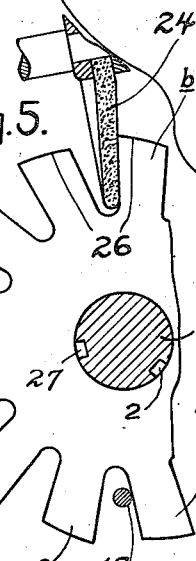
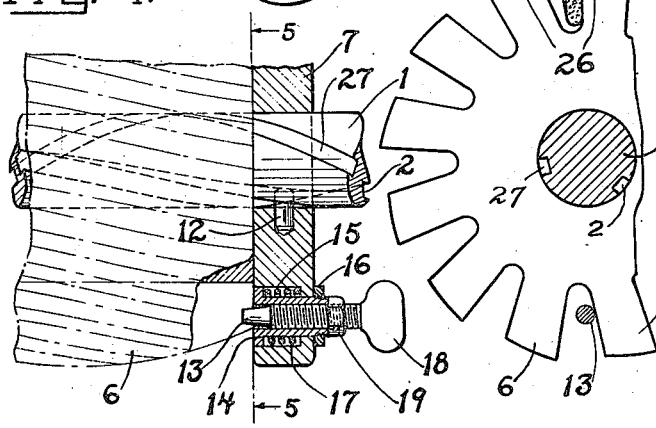
Inventor
Friederich Müller
By Joseph K. Schofield
Attorney Patented Nov. 4, 1924.

1,514,392

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

CUTTER-GRINDING ATTACHMENT.

Application filed June 27, 1921. Serial No. 480,771.

*To all whom it may concern:*

Be it known that I, FRIEDERICH MÜLLER, a citizen of the United States, and a resident of Hartford, in the county of Hartford and State of Connecticut, have invented certain new and useful Improvements in Cutter-Grinding Attachments, of which the following is a specification.

This invention relates to cutter grinding mechanisms and particularly to a cutter grinding attachment adapted to support a milling cutter thereon and to guide the movement of the cutter relative to a grinding wheel whereby to grind the teeth of the cutter. The attachment is particularly adapted for grinding cutter teeth of a spiral, that is, helical configuration, and it is the primary object of the invention to provide an extremely simple attachment for performing this function.

The particular object for which the present invention is applicable and which is selected for illustration in the drawing is the grinding of the front cutting surfaces on the teeth of a contour milling cutter having helicoidal flutes. As is well known, milling cutters of this type require frequent sharpening, this being accomplished by grinding the forward surfaces of the radial faces of the teeth. Applicant has therefore provided the described device which may be applied readily to any standard form of tool grinder by mounting it upon the work supporting centers. By selecting an arbor having the correct form of flute, cutters having helicoidal cutting surfaces of any lead may be readily ground.

With the above and other objects in view, my invention consists in the features of construction and operation set forth in the following specification and illustrated in the accompanying drawing. In such drawing annexed hereto and forming a part of this specification, I have shown one embodiment of my invention but it will be understood that the invention can be otherwise embodied and that the drawing is not to be construed as defining or limiting the scope of the invention, the claims appended to this specification being relied upon for that purpose.

Referring to the figures of the drawing:

Figure 1 is an elevational view of the attachment in connection with a grinding wheel and a milling cutter, the grinding wheel being in position for grinding the teeth of the cutter.

Figs. 2 and 3 are enlarged elevations of a pair of clamping plates for supporting the cutter in its grinding position.

Fig. 4 is an enlarged fragmentary detail view of the attachment.

Fig. 5 is a fragmentary detail view taken on the line 5—5 of Fig. 4.

Fig. 6 is a fragmentary detail view of the face plate and the cutter adjusting means thereon, taken on line 6—6 of Fig. 1.

The invention in its simplest form comprises an attachment to be applied to a standard form of universal tool grinder and comprises a device to be mounted on the work supporting centers of a machine of this type. The attachment in its preferred embodiment comprises an arbor adapted to be mounted on the work supporting centers and having one or more helical splines extending about the periphery of the arbor from end to end. The cutter is adapted to be mounted on this arbor in such a way that it may be traversed back and forth along the arbor and simultaneously be turned in accordance with the helical spline. This means is illustrated as comprising a pair of plates, a key in one plate engaging the spline, and also a means for holding the cutter in position on the arbor to have its teeth engaged by a grinding wheel. This latter means is provided preferably for slightly rotating the cutter toward the grinding wheel for feeding it into position to be ground. The details of the embodiment of the invention illustrated in the drawing will now be described.

In Fig. 1, I have illustrated an arbor or shaft 1 provided therein with a spline groove 2 of a pitch corresponding to the pitch or lead of the teeth of the cutter it is desired to grind. The arbor may be mounted on centers 3 and 4 and held from rotation by means of a dog 5. The cutter to be ground, illustrated at 6, is adapted to be mounted on the arbor between a pair of supporting plates 7 and 8. These plates are held against the ends of the cutter by means of bolts 9 passing through holes 10 in the plates, a spring 11 surrounding each bolt and serving to hold the plates with a resilient pressure against the cutter ends.

The plate 7 is provided with a pin or key 12 adapted to engage in the spline 2 of the arbor. A pin or screw provided with a tapered end 13 is mounted in the plate 7 and is adapted to engage the rear face of a tooth of the cutter to hold the cutter in the proper position for grinding. This pin is preferably threaded into a bushing 14 mounted to slide in an opening 15 in the plate, a check nut 16 serving to limit the inward movement of the bushing. A spring 17 normally holds the bushing in a forward position with the check nut 16 against the plate. The screw may be adjusted by means of a thumb piece 18 and is secured in adjusted position by means of a lock nut 19.

In Figs. 1 and 6 is illustrated means for slightly rotatably adjusting the arbor 1. This means comprises a pair of screws 20 and 21 threaded into the face plate 22 and adapted to engage the arm 23 of the dog 5. The operation of this mechanism and the purpose thereof will be hereinafter described.

A grinding wheel 24 is illustrated as mounted on a support 25, the wheel being adapted to ride in the spiral groove between adjacent teeth 26 of the cutter as the latter is moved longitudinally along the shaft 1. In the grinding operation, the lead of the cutter teeth being ground must conform with that of the spline engaged by the key 12. Furthermore it is necessary to have the grinding wheel 24 adjusted to correspond to the helix angle of the cutter being ground. This adjustment is preferably accomplished by varying the position of the wheel support 25, an adjustment usually provided in tool grinders for which the present attachment is adapted. The angular adjustment of the wheel will, of course, vary with the lead and diameter of the teeth being ground. To provide for grinding various cutters each having teeth of a different lead, the shaft 1 may be provided with a plurality of grooves therein, each of a different lead. In Fig. 4, I have illustrated a second groove or spline 27 having a steeper lead than the spline 2. The key 12 is adapted to be engaged in and to follow either of these splines.

The operation of the improved attachment is as follows: the cutter to be ground is mounted on the arbor 1 disposed between the plates 7 and 8 as shown in Fig. 1 and with the key 12 engaged in a spline in the arbor corresponding in lead to the lead of the cutter being ground. The wheel support 25 is then adjusted to the correct angle corresponding to the helix angle of the flutes. The arbor 1 is then adjusted rotatively to a position such that the pin 13 occupies a position in a flute between two adjacent teeth and with the cutting surface of the wheel approximately in contact with the cutting surface of one of the teeth on the cutter.

The cutter may be accurately rotatably adjusted to feed the tooth being ground toward the grinding wheel by either of the two means heretofore described. The first of these means comprises the tapered screw 13. It is obvious that threading such screw inwardly (Fig. 5) against the back of the tooth a will slightly rotate the cutter to feed the tooth b against the grinding wheel. Such feeding may also be accomplished by means of the adjusting screws 20 and 21 illustrated in Figs. 1 and 6. In this latter case, the attachment rotates the arbor 1 and the cutter thereon.

When it is desired to index the cutter to grind an adjacent tooth the cutter is moved along the arbor free from the grinding wheel, the notch 28 in the plate 7 permitting the passage of the grinding wheel therethrough. The pin 13, with the bushing 14, is then drawn outwardly against the action of spring 17 until the tapered portion of the pin is free from the cutter, whereupon the cutter may be indexed to place the next tooth in position for grinding. Should it be desired to omit the spring 17, the springs 11 will yield sufficiently to permit the cutter to be indexed. It will be clear that during the grinding operation, the cutter is held in position against the grinding wheel by means of the tapered pin 13, as illustrated in Fig. 5.

What I claim is:

1. An attachment for grinding milling cutters comprising the combination of a shaft provided with a spline formed therein with a lead corresponding to the lead of the cutter it is desired to grind, the shaft being adapted to have the cutter mounted thereon, means on the shaft operatively connected to the spline, a pin on the said means, the pin being provided with a tapered portion adapted to engage a shoulder on the cutter for rotating the cutter with the said means in conformity with the spline as they are moved along the shaft, and means for adjusting the pin longitudinally.

2. An attachment for grinding milling cutters comprising the combination of a shaft provided with a spline formed therein with a lead corresponding to the lead of the cutter it is desired to grind, the shaft being adapted to have the cutter mounted thereon, a pair of plates adapted to be mounted on the shaft, means for securing the plates together with the cutter therebetween, one of the plates being operatively connected to the spline, and means for connecting the said one plate with the cutter whereby the cutter rotates with the plate in conformity with the spline as they are moved along the shaft.

3. An attachment for grinding milling cutters comprising the combination of a shaft provided with a spline formed therein with a lead corresponding to the lead of the cutter it is desired to grind, the shaft being adapted to have the cutter mounted thereon, a pair of plates adapted to be mounted on the shaft, means for resiliently holding the plates together with the cutter therebetween, one of the plates being operatively connected to the spline, and means for connecting the said one plate with the cutter whereby the cutter rotates with the plate in conformity with the spline as they are moved along the shaft.

In testimony whereof, I hereto affix my signature.

FRIEDERICH MÜLLER.